US008049931B2

(12) United States Patent
Takahashi et al.

(10) Patent No.: US 8,049,931 B2
(45) Date of Patent: Nov. 1, 2011

(54) IMAGE FORMING APPARATUS AND IMAGE FORMING METHOD FOR SETTING A MARGIN REGION, A DENSITY CHANGE REGION, AND REGULAR DENSITY REGION

(75) Inventors: Atsushi Takahashi, Tokyo (JP); Utami Soma, Tokyo (JP); Tadashi Matsudaira, Takatsuki (JP); Youbao Peng, Tokyo (JP); Hiroshi Oyama, Tokyo (JP); Shinpei Kawasaki, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 1005 days.

(21) Appl. No.: 11/948,468

(22) Filed: Nov. 30, 2007

(65) Prior Publication Data
US 2008/0170266 A1  Jul. 17, 2008

(30) Foreign Application Priority Data
Jan. 12, 2007  (JP) .................................. 2007-004338

(51) Int. Cl.
*H04N 1/40* (2006.01)
(52) U.S. Cl. ............................. 358/3.1; 358/1.1; 358/1.9
(58) Field of Classification Search .................. 358/1.1, 358/1.9, 3.1, 448, 451
See application file for complete search history.

(56) References Cited

U.S. PATENT DOCUMENTS

| 5,600,412 A | * | 2/1997 | Connors | ........................ 399/81 |
| 5,872,897 A | * | 2/1999 | Jones et al. | .................... 358/1.9 |

FOREIGN PATENT DOCUMENTS

| JP | 5-216333 | | 8/1993 |
| JP | 2001-18443 | A | 1/2001 |
| JP | 2002-333743 | A | 11/2002 |
| JP | 2003-127341 | A | 5/2003 |
| JP | 2003-266854 | A | 9/2003 |

* cited by examiner

*Primary Examiner* — Thomas D Lee
(74) *Attorney, Agent, or Firm* — Cantor Colburn LLP

(57) ABSTRACT

An image forming apparatus for forming an image on a transfer sheet based on image data, comprises an operating section to determine a setup about a margin region on which an image is not formed at an edge portion of the transfer sheet, a control section to determine an inner region having a specified width and being adjacent to the determined margin region as a density change region in which an image density is changed, and determines a more inner region located inward more from the density change region as a regular density region in which an image is formed with a regular image density, and an image forming section to form an image in the density change region based on image data on the condition where the image density is reduced and to form an image in the regular density region based on image data without changing the image density.

16 Claims, 9 Drawing Sheets

IMAGE FORMING APPARATUS AND IMAGE FORMING METHOD FOR SETTING A MARGIN REGION, A DENSITY CHANGE REGION, AND REGULAR DENSITY REGION

This application is based on Japanese Patent Application No. 2007-004338 filed on Jan. 12, 2007, in Japanese Patent Office, the entire content of which is hereby incorporated by reference.

BACKGROUND OF THE INVENTION

The present invention relates to an image forming method and an image forming apparatus which performs image formation, such as a copying machine and a printer, especially, relates to an image forming apparatus and an image forming method which sets up a margin region.

In various kinds of image forming apparatus, such as a copying machine and a printer, a margin region on which an image is not formed is generally provided to an edge of a transfer sheet for prevention of dirt produced by toner scattering within an apparatus and for prevention of deficit of an image, etc.

When an image is formed near to the edge of a transfer sheet as nearer as possible, toner which should be transferred to the edge of a transfer sheet scatters to conveyance members such as a guide plate and a roller not to the edge of a transfer sheet being a true transfer position due to causes such as a run gap of a transfer sheet and an error of transfer paper size.

And the toner transferred to the conveying member will adhere near the edge of the following transfer sheet, and will spread as dirt of a transfer sheet, and dirt of each part of the inside of an apparatus. For this reason, in general image forming apparatus, a fixed margin defined beforehand was provided for a transfer sheet at the time of image formation such that scattering of toner to a conveying member and dirt resulting from this toner scattering might not take place.

On the other hand, as a user, there is a case desire to form an image in the whole transfer sheet without forming a margin. Then, when not forming a margin, a special mode different from a usual image formation mode and to change a carrying speed to a low speed was operated such that the run gap mentioned above might not take place.

Incidentally, various kinds of proposals were made by the following patent documents as techniques of this kind of margin preparation.

According to the technique by the Japanese Patent Unexamined Publication No. 5-216333, the imaging region of a transfer sheet is restricted by controlling transfer current, whereby toner scattering is suppressed and dirt of the edge portion of a transfer sheet is reduced. However, the problem which this technique can cope with only the leading end and the trailing end of a transfer sheet transportation direction (sub scanning direction) is left behind.

According to the technique by the Japanese Patent Unexamined Publication No. 2001-18443, this technique relates a technique to correctly control the timings of the leading and trailing ends of a laser beam by masking signals, and further relates to a technique to control each masking signal in the case of using a plurality of beams. Therefore, a problem which the technique merely control the start position of a main scanning direction and a terminal position of the main scanning direction.

According to the technique by the Japanese Patent Unexamined Publication No. 2003-266854, this technique is to select whether a margin region is formed or not. In the case that a margin region is formed, this technique changes an image size. Therefore, this publication does not disclose the technique regarding a proper margin not causing dirt.

According to the technique by the Japanese Patent Unexamined Publication No. 2002-333743, by controlling a developing section and a transferring section so as to limit an image density, this technique refrains toner scattering and reduces dirt on an end portion of a transfer sheet. However, this technique merely regulates image density by changing a developing bias. Therefore, the problem which this technique can cope with only the leading end and the trailing end of a transfer sheet transportation direction (sub scanning direction) is left behind.

According to the technique by the Japanese Patent Unexamined Publication No. 2003-127341, this technique relates to an inkjet and is to restrict ink jetting on an end portion of a transfer sheet. Therefore, the problem which this technique can't be applied to an electro-photographic type image forming apparatus employing toner is left behind.

SUMMARY

The present invention is achieved in view of above problems, an object of the present invention is to realize an image forming apparatus and an image forming method capable of executing an image formation in which an occurrence of dirt on an end portion of a transfer sheet is suppressed while responding a desire of a user to make a margin as small as possible.

The above object can be attained by the following image forming apparatus and the image forming method reflecting one aspect of the present invention.

An image forming apparatus for forming an image on a transfer sheet based on image data, comprises:

an operating section to set a margin region on which an image is not formed at an edge portion of the transfer sheet, a control section to determine an inner region having a specified width and being adjacent to the determined margin region as a density change region in which an image density is changed, and determines a more inner region located inward from the density change region as a regular density region in which an image is formed with a regular image density, and an image forming section to form an image in the density change region based on image data on the condition where the image density is reduced and to form an image in the regular density region based on image data without changing the image density.

An image forming method of forming an image on a transfer sheet based on image data, comprises:

receiving a setup about a margin region on which an image is not formed at a transfer sheet edge portion;

determining an inner region having a specified width and being adjacent to the set margin region as a density change region in which an image density is changed;

determining a more inner region located inward from the density change region as a regular density region in which an image is formed with a regular image density; and controlling in such a way that in the density change region, an image is formed based on image data on the condition where the image density is reduced, and in the regular density region, an image is formed based on image data without changing the image density.

DETAILED DESCRIPTION OF THE PREFERRED EMBODIMENT

Figure 1:
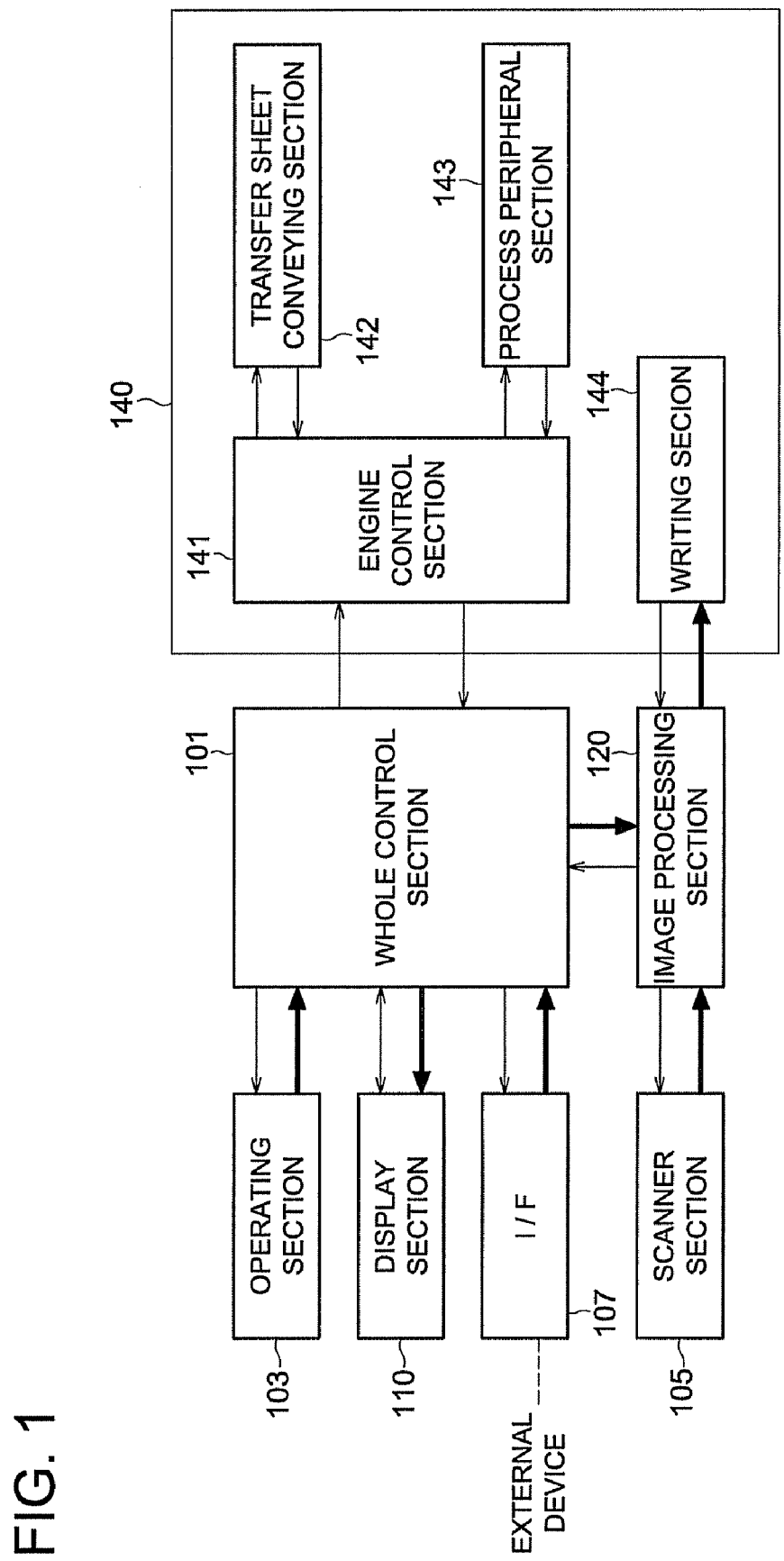
FIG. 1 is a functional block diagram showing an electric structure of an image forming apparatus according to an embodiment of the present invention.

Hereafter, preferable embodiments of the present invention are explained, however, the present invention is not limited to these embodiments.

Firstly, preferable embodiments according to the present invention are explained.

(1) In Item 1, an image forming apparatus comprises a control means to receive a setup about a margin region on which an image is not formed at a transfer sheet edge portion, to determine an inner region having a specified width and being adjacent to the set margin region as a density change region in which an image density is changed, to determine an inner region located at an inner side from the density change region as a regular density region in which an image is formed with a regular image density, and to control in such a way that in the density change region, an image is formed based on image data on the condition where the image density is reduced, and in the regular density region, an image is formed based on image data without changing the image density.

(2) In Item 2, the image forming apparatus described in Item 1 is characterized in that the control section receives the setup on a condition that where a range of settable value of the margin region includes zero.

(3) In Item 3, the image forming apparatus described in Item 1 or 2 is characterized in that the width of the density change region is a predetermined value.

(4) In Item 4, the image forming apparatus described in Item 1 or 2 is characterized in that the control section receives a setup about the width of the density change region.

(5) In Item 5, the image forming apparatus described in Item 1 or 2 is characterized in that the control section determines the width of the density change region in accordance with a set value of the margin region.

(6) In Item 6, the image forming apparatus described in any one of Items 1 to 5 is characterized in that in an image forming apparatus to conduct exposure to a photoreceptor in accordance with image data, the control section controls at least one of the intensity of exposure to the photoreceptor or an exposure pulse width as a control to reduce the image density in the density change region.

(7) In Item 7, the image forming apparatus described in Item 4 is characterized in that the control section receives the setup of the margin region or the density change region independently for each of four sides of a transfer sheet.

(8) In Item 8, the image forming apparatus described in Item 4 is characterized in that there is provided a sensor to detect an image formed on a transfer sheet, and when the set margin region differs from a margin region (the detected margin region) detected by the sensor, the control section changes an imaging region so as to conform the setup margin region to the detected margin region.

(9) In Item 9, the image forming apparatus described in any one of Items 1 to 8 is characterized in that the image forming apparatus forms a latent image by exposing a photoreceptor in accordance with image data, develops the latent image on the photoreceptor with toner, transfers a toner image on the photoreceptor to a transfer sheet, thereby forming an image.

(10) In Item 10, the image forming apparatus described in any one of Items 1 to 9 is characterized in that there is provided a display to conduct various indications and a sensor to detect an image formed on a transfer sheet, when dirt is detected on a edge portion of a transfer sheet, the control section controls the display section to display an indication to urge a setup change for the margin region setup or the density change region setup.

(11) In Item 11, the image forming apparatus described in any one of Items 1 to 9 is characterized in that there is provided a sensor to detect an image formed on a transfer sheet, when dirt is detected on a edge portion of a transfer sheet, the control section controls to change the image density decreasing rate in the density change region.

(12) In Item 12, the image forming apparatus described in any one of Items 1 to 9 is characterized in that the control section controls the image density decreasing rate in the density change region independently for each of four sides of a transfer sheet in accordance with a position or amount of dirt detected on an edge portion of a transfer sheet.

(13) In Item 12, in an image forming method for forming an image on a transfer sheet based on image data, the image forming method is characterized by receiving a setup about a margin region on which an image is not formed at a transfer sheet edge portion; determining an inner region having a specified width and being adjacent to the set margin region as a density change region in which an image density is changed; determining an inner region located at an inner side from the density change region as a regular density region in which an image is formed with a regular image density; and controlling in such a way that in the density change region, an image is formed based on image data on the condition where the image density is reduced, and in the regular density region, an image is formed based on image data without changing the image density According to the invention described in above Items, the following effects can be obtained.

Since the image forming apparatus of the present invention comprises the operating section to set a margin region on which an image is not formed, a margin region can be set optionally in accordance with a desire of a user.

For example, there is a desire to use an A-4 size wide sheet having a larger size than an A-4 regular size as an A-4 regular size transfer sheet. In this case, a wide portion of the A-4 wide sheet larger than the A-4 regular size is set as a margin region by the operating section, and an image is formed an entire region of the A-4 regular size transfer sheet. Thereafter, by cutting the margin region, an A-size borderless print can be produced. Further, in this case, when the margin region has a predetermined width, the control section can set an entire imaging region as the regular density region, on the other hand, when the margin region has a width smaller that the predetermined width, the control section can set a density change region between the margin region and the regular density region.

As another example, for example, there is a desire to form an image on a post card as a borderless print. In this case, the operating section sets "no margin region" and the control section sets a density change region between the end portion of a post card size transfer sheet and a regular density region, whereby an image is formed on a transfer sheet of a borderless print while preventing dirt on the end portion of the post card size transfer sheet.

Further, in the present invention, since the operating section can set a set value independently for each of four sides of a transfer sheet, the operating section can handle various sizes of wide sheets and various sizes of post cards.

(1) In the image forming apparatus described in Item 1, the image forming apparatus receives a setup about a margin region on which an image is not formed at a transfer sheet edge portion, determines an inner region having a specified width and being adjacent to the set margin region as a density change region in which an image density is changed, determines an inner region located at an inner side from the density change region as a regular density region in which an image is formed with a regular image density, and controls in such a way that in the density change region, an image is formed based on image data on the condition where the image density is reduced, and in the regular density region, an image is formed based on image data without changing the image density.

Here, an inner region having a specified width and being adjacent to the set margin region is determined as a density change region, and in the density change region, an image is formed based on image data on the condition where the image density is reduced.

For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region, an amount of toner scattering to conveying members in an apparatus (outside of a transfer sheet) is reduced. As a result, dirt on an image at an edge portion of a transfer sheet can be avoided. Further, when an image is formed with a setup to make a margin region to be zero (no margin region), it is not necessary to reduce a conveying speed and it is possible to form an image with a regular conveying speed. Namely, while responding to a user's request to minimize a margin, it becomes possible to conduct an image formation in which dirt on an edge portion of a transfer sheet is suppressed.

(2) In the image forming apparatus described in Item 2, a setup is received on the condition that a range of settable value includes zero as a margin region. For this reason, even in the case where an margin region is set at zero by an user of the image forming apparatus and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region, an amount of toner scattering to conveying members in an apparatus (outside of a transfer sheet) is reduced. As a result, dirt on an image at an edge portion of a transfer sheet can be avoided. Namely, while responding to a user's request to minimize a margin, it becomes possible to conduct an image formation in which dirt on an edge portion of a transfer sheet is suppressed.

(3) In the image forming apparatus described in Item 3, the width of the density change region is a predetermined value. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width, an amount of toner scattering to conveying members in an apparatus (outside of a transfer sheet) is reduced. As a result, dirt on an image at an edge portion of a transfer sheet can be avoided. Namely, while responding to a user's request to minimize a margin, it becomes possible to conduct an image formation in which dirt on an edge portion of a transfer sheet is suppressed.

(4) In the image forming apparatus described in Item 4, the control section receives a setup about the width of the density change region. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width set by an user of this image forming apparatus, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

(5) In the image forming apparatus described in Item 5, the control section determines the width of the density change region in accordance with a set value of the margin region. In this case, for example, the sum total of the margin region and the density change region is determined to become a predetermined width.

For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width set by a control section, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

(6) In the image forming apparatus described in Item 6, in an image forming apparatus to conduct exposure to a photoreceptor in accordance with image data, a control to reduce at least one of the intensity of exposure to the photoreceptor or an exposure pulse width is conducted as a control to reduce the image density in the density change region. With this, the density in the density change region can be controlled appropriately, and it becomes possible to refrain the occurrence of dirt on a transfer sheet edge portion while keeping a good image quality. Namely, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width set by an user of this image forming apparatus (a control to reduce at least one of the intensity of exposure to the photoreceptor or an exposure pulse width), an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

(7) In the image forming apparatus described in Item 7, the control section receives the setup of the margin region or the density change region independently for each of four sides of a transfer sheet. In this case, while responding to a user's request to minimize a margin in each portion in accordance with a portion or a direction where dirt on a transfer sheet is apt to take place due to toner scattering to conveying members in the apparatus (out of the transfer sheet) or a position or a direction where dirt hardly take place, it is possible to realize an image forming apparatus capable of conducting an image formation in which an occurrence of dirt on a transfer sheet edge portion is suppressed. By doing this, it can be possible to respond a user's request to minimize a margin and a user's request to maximize a regular density region.

(8) In the image forming apparatus described in Item 8, there is provided a sensor to detect an image formed on a transfer sheet, and when the set margin region differs from a margin region (the detected margin region) detected by the sensor, the control section changes an imaging region (a density change region and a regular density region) so as to conform the setup margin region to the detected margin region.

For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to adjust a margin region to be a normal condition and to reduce an image density in a density change region with a predetermined width, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

(9) In the image forming apparatus described in Item 9, the image forming apparatus forms a latent image by exposing a photoreceptor in accordance with image data, develops the latent image on the photoreceptor with toner, and transfers a toner image on the photoreceptor to a transfer sheet, thereby forming an image.

For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

(10) Further, in the image forming apparatus described in Item 10, in items 1 to 9, there is provided a display to conduct various indications and a sensor to detect an image formed on a transfer sheet, when dirt is detected on an edge portion of a transfer sheet, the control section controls the display section to display an indication to urge a setup change for the margin region setup or the density change region setup. In this case, the control section control the display section to conduct a display to urge an user of the image forming apparatus to increase a margin region or a density change region. With this, it becomes possible to adjust a relationship among a user's request to minimize a margin, a user's request to maximize a regular density region and a prevention of dirt on a transfer sheet due to toner scattering.

(11) Further, in the image forming apparatus described in Item 11, in items 1 to 9, there is provided a sensor to detect an image formed on a transfer sheet, when dirt is detected on an edge portion of a transfer sheet by the sensor, the control section controls to change the image density decreasing rate in the density change region. In this case, the control section controls to reduce toner by decreasing further the image density in the density change region. With this, while responding to a user's request to minimize a margin or a user's request to maximize an ordinary density region, it becomes possible to conduct an image formation in which dirt on an edge portion of a transfer sheet is suppressed.

(12) Further, in the image forming apparatus described in Item 12, in items 1 to 9, the control section controls the image density decreasing rate in the density change region independently for each of four sides of a transfer sheet in accordance with a position or amount of dirt detected on an edge portion of a transfer sheet.

In this case, the control section estimates an occurrence position of toner scattering on a transfer sheet from the position of dirt detected on the transfer sheet, and the control section control to reduce toner by decreasing further the image density in the density change region at a position corresponding to the occurrence position so as to reduce toner scattering at the occurrence position. With this, while responding to a user's request to minimize a margin or a user's request to maximize an ordinary density region, it becomes possible to conduct an image formation in which dirt on an edge portion of a transfer sheet is suppressed.

(13) In the image forming method described in Item 13, receiving a setup about a margin region on which an image is not formed at a transfer sheet edge portion; determining an inner region having a specified width and being adjacent to the set margin region as a density change region in which an image density is changed; determining an inner region located at an inner side from the density change region as a regular density region in which an image is formed with a regular image density; and controlling in such a way that in the density change region, an image is formed based on image data on the condition where the image density is reduced, and in the regular density region, an image is formed based on image data without changing the image density.

Here, an inner region having a specified width and being adjacent to the set margin region is determined as a density change region, and in the density change region, an image is formed based on image data on the condition where the image density is reduced.

For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region, an amount of toner scattering to conveying members in an apparatus (outside of a transfer sheet) is reduced. As a result, dirt on an image at an edge portion of a transfer sheet can be avoided. Further, when an image is formed with a setup to make a margin region to be zero (no margin region), it is not necessary to reduce a conveying speed and it is possible to form an image with a regular conveying speed. Namely, while responding to a user's request to minimize a margin, it becomes possible to conduct an image formation in which dirt on an edge portion of a transfer sheet is suppressed.

Hereafter, the best mode (hereafter, referred as embodiment) to carry out the present invention is explained in detail.

Incidentally, even if an image forming apparatus (a copying apparatus) is provided with a function to copy by reading the content of a copy target as image information with a document reading section (scanner), or even if an image forming apparatus is not provided with a document reading section (scanner), it is possible to apply the present invention to them. Further, even if an image forming apparatus is a complex machine provided with a facsimile function, it is also possible to apply the present invention to it.

First Embodiment

Figure 4:
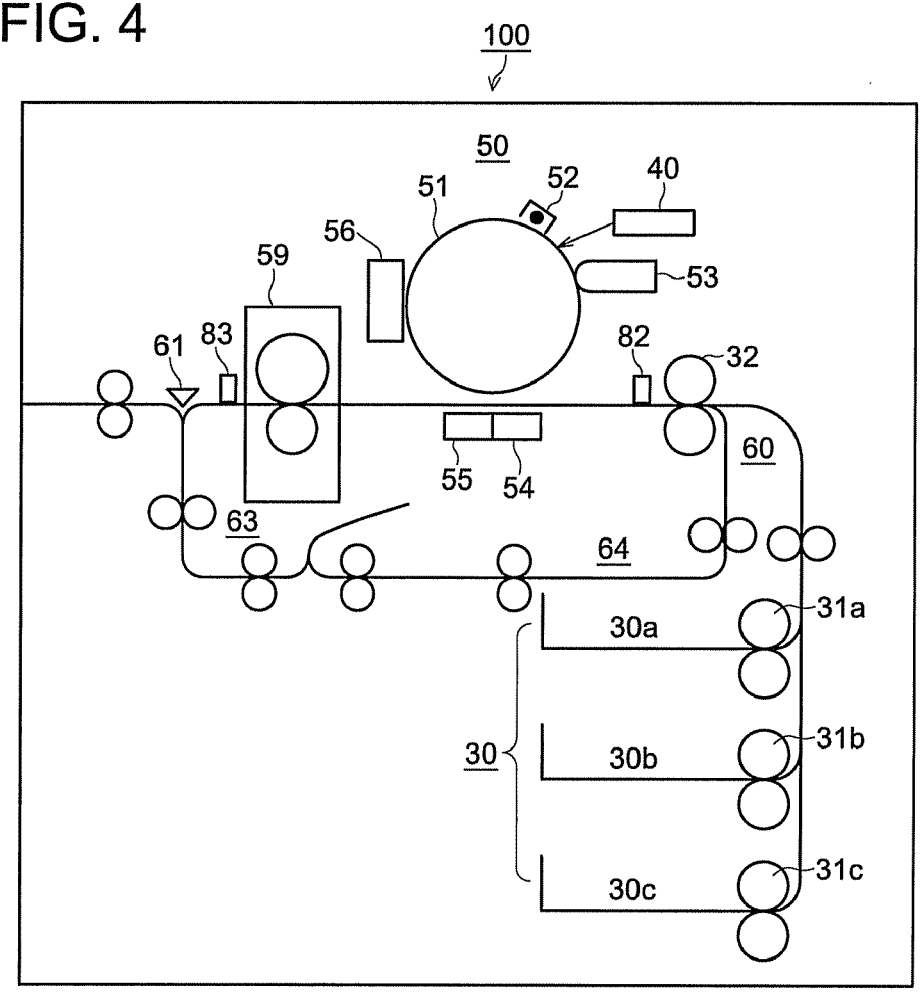
FIG. 4 is a block diagram showing a structure of an image forming apparatus according to an embodiment of the present invention.

First, with reference to FIG. 4, a mechanical composition of the entire configuration of an apparatus with which an image forming apparatus of the embodiment can be applied is explained.

<Mechanical Structure and Whole Operation of an Image Forming Apparatus>

FIG. 4 is a diagram showing a mechanical structure of an image forming apparatus 100. In addition, here, a printer and copying machine of an electrophotography system are used as an example of the image forming apparatus.

In FIG. 4, 30 is a sheet feeding section for feeding transfer sheets having been accumulated, and the sheet feeding section 30 is equipped with three-stage sheet feeding sections 30a, 30b and 30c. 40 is an image writing section which generates a light beam (laser beam) for exposure according to image data, and is structured with a solid scan type light modulating device, a laser beam exposing device. 50 is an image forming section which records image data on a recording medium p (generally, although the recording medium is called "recording paper" or "transfer sheet", it will be called a "transfer sheet" in the present specification) with an electrostatic method, and is equipped with a drum 51, a charging section 52, a developing section 53, a transferring section 54, a separating section 55, a cleaning section 56, and a fixing section 59. 60 is a conveyance drying section which conveys a transfer sheet, is equipped with a reversal conveying section 63, a circulation conveying section 64 for double-sided image formation.

Moreover, 82 is a tip detection sensor which detects the tip of a transfer sheet fed from the sheet feeding section 30, and is arranged near a second feeding roller. Here, according to a command of an image formation from a control section mentioned later, from either of the sheet feeding sections 30a-30c into which transfer sheets p are loaded, a transfer sheet p is drawn out with first feeding rollers 31a to 31c, and fed out toward the image forming section 50. Incidentally, although the three-stage sheet feeding section is made into an example as a plurality of sheet feeding sections, it may not be limited to this example, an one-stage sheet feeding section and a two-stage sheet feeding section may be employed, and a four or more stage type is also employable.

A transfer sheet p being fed to an image forming section 50 approaches the drum 51 as an image bearing member, after it is synchronized with the formation of a toner image on a drum 51 so as to make a transfer sheet interval to be constant by a second feeding roller (resist roller) 32 located near an entrance to the image forming section 50.

Moreover, at this time, the tip of a transfer sheet p is detected by the tip detection sensor 82, and the below-mentioned irradiation timing of a laser light to a drum 51 is determined according to this detection result and control of the control section. Image data are inputted into the image writing section 40 from a record image processing section, laser light according to the image data is irradiated on the drum 51 from a laser diode in the image writing section 40 according to the detection result for a transfer sheet p by the tip detection sensor 82, whereby an electrostatic latent image is formed on the drum 51. By developing this electrostatic latent image by the developing section 53, a toner image is formed on the drum 51.

This toner image is transferred onto a transfer sheet p by the transferring section 54 located at the lower part of the drum 51. And, the transfer sheet p being brought in pressure contact with the drum 51 is separated from the drum 51 by the separating section 55. The transfer sheet p separated from the drum 51 goes into the fixing section 59 through a conveyance mechanism, and the toner image is fixed with heat and pressure. Thus, an image is formed on the transfer sheet p.

In addition, if needed, the transfer sheet p on which the toner image is fixed is conveyed below through a guide 61, and goes into the reversal conveying section 63. Next, the transfer sheet p proceeding in the reversal conveying section 63 is again drawn out with a reversal roller which is not illustrated, and is again sent to the image forming section 50 via the circulation conveying section 64 for double-sided image formation. In the image forming section 50 in which an image formation on one side is ended, the toner adhering to the drum 51 is removed in the cleaning section 56, successively the drum 51 is electrified by the charging section 52, whereby the next image formation is prepared.

In this state, the transfer sheet p is again conveyed into the image forming section 50, and an image is formed on another surface (surface on which an image is not formed) of the transfer sheet p. The transfer sheet p separated from the drum 51 in the separating section 55 goes into the fixing section 59 again, and is fixed.

Therefore, in a portion following the second feeding roller 32, various conveyance rollers and conveyance belts which convey a transfer sheet constitute the conveyance driving section 60, and a predetermined control is conducted with regard to conveyance by this conveyance actuator 60 in this embodiment.

Thus, a transfer sheet p in which image formations onto both of a reverse surface and an obverse surface are completed, or a transfer sheet p in which an image formation onto one surface is completed is delivered to a delivering section, or is subjected to a post processing by a post processing device.

In addition, the amount (width) of a margin area on a transfer sheet or dirt of an image at an edge portion in a transfer sheet is detected by the line sensor 83 arranged in the vicinity of the fixing section 59.

<Appearance of an Image on a Transfer Sheet>

Figure 3:
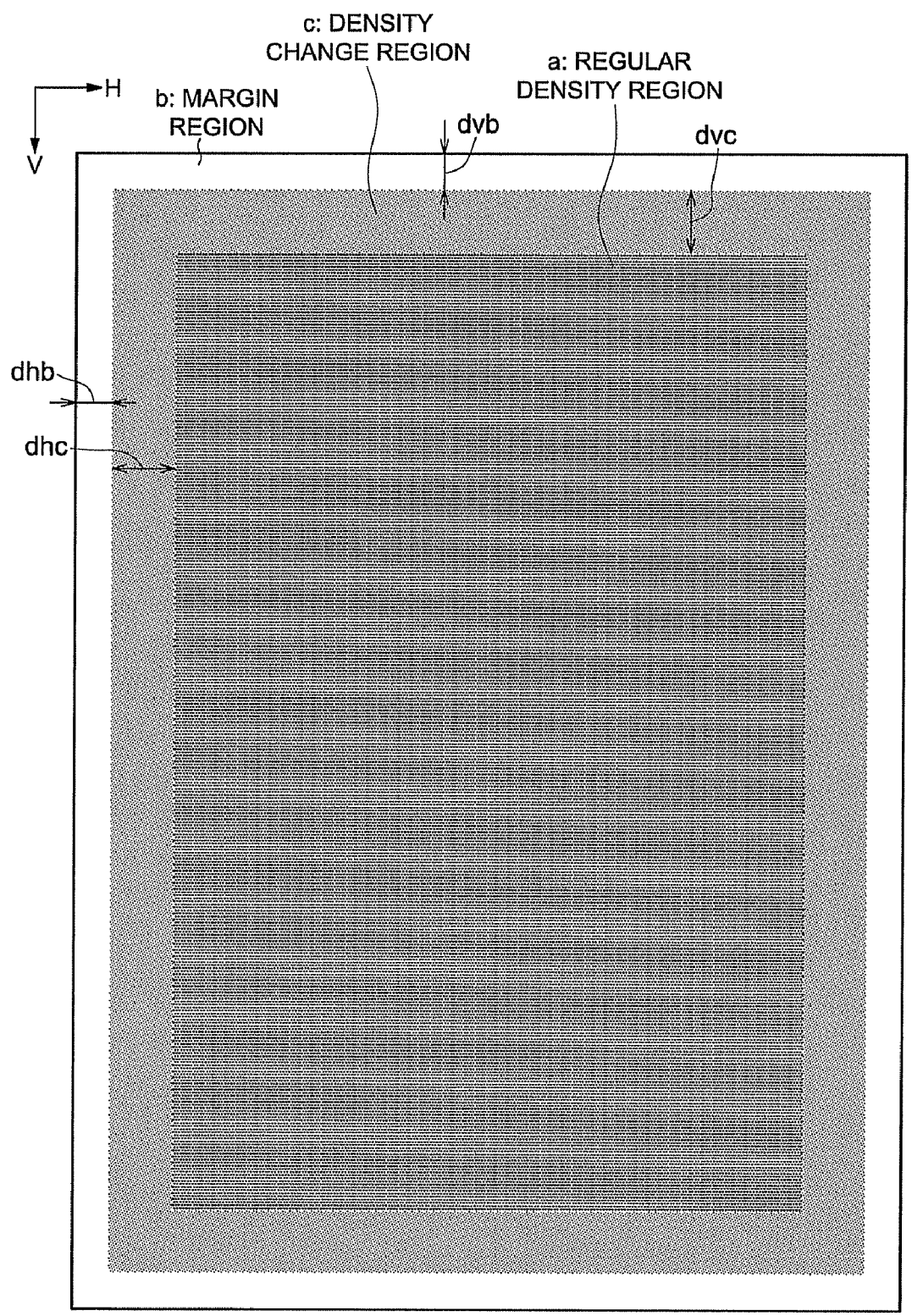
FIG. 3 is an explanatory drawing showing an appearance of a transfer sheet outputted from an image forming apparatus according to an embodiment of the present invention.

FIG. 3 is an explanatory drawing showing the appearance of a transfer sheet on which an image formation was carried out by the control according to this embodiment.

In FIG. 3, "b" is a margin region at a transfer sheet edge portion on which an image is not formed, and the inner side of this margin region "b" is an imaging region (a density change region and a regular image region) mentioned later.

And, "c" is a density change region which locates at an inner side so as to be adjacent to the margin region b, is a part of the imaging region and in which an image formation is conducted on the condition where the image density is reduced.

Further, "a" is a regular density region which is located inside the density change region c and is a part of the imaging range, and in which an image is formed without conducting the image density change.

<Electric Structure of the Image Forming Apparatus>

FIG. 1 is a functional block diagram showing a detailed electric structure in the image forming apparatus of the first embodiment of the present invention with the classification based on respective functions.

100 is various kinds of image forming apparatus which carries out an image formation for various transfer sheets and output the various transfer sheets.

This image forming apparatus 100 is provided with a whole control section 101 to perform various control which includes a predetermined control based on a margin region setup and a density change region setup, an operating section 103 to receive various setups and operation such as an input for a setup of a margin region and a setup of a density change region from a user, a scanner section 105 to read an image and to generate image data, an interface (I/F) 107 to receive image data from an external device (not shown), a display section 110 to display various status of the image forming apparatus, the picture-processing part 120 to performs various image processing, and a print engine (an image forming section) 140 to form an image on a transfer sheet based on image data.

In this connection, the print engine 140 is provided with an engine control part 141 to perform control as a print engine, a transfer sheet conveying section 142 to convey a transfer sheet, a process peripheral section 143 to perform charging, developing, transferring, separating, fixing, etc., and a writing section 144 to generate a light beam for exposure according to image data and to write in an image.

<Explanation of Operation in this Embodiment>

With regard to the above image forming apparatus, the explanation of operation is given with reference to each drawing.

Incidentally, the whole control section 101 and the engine control part 141 receive setup about the margin region on which an image is not formed at a transfer sheet edge portion, determine an inner region having a specified width and being adjacent to the set-up margin region as a density change region in which image density is changed, determine an inner region from the density change region as a regular density region in which an image formation is carried out with regular image density, and control in such a way that in the density change region, an image formation is carried out based on image data on the condition where image density is reduced, and in the regular density region, an image formation is based on image data without changing image density.

Moreover, the whole control section 101 performs control which receives setup through the operating section 103 on the condition that the setting range of the margin region includes zero (no margin).

Moreover, the whole control section 101 performs a control to set a predetermined value as the width of a density change region, or a control to receive setup about the width of a density change region through the operating section 103.

Moreover, the whole control section 101 performs a control to receive setup independently for each of four sides of a transfer sheet with regard to setup about a margin region or a density change region through the operating section 103.

Moreover, the whole control section 101 performs a control to determine the width of a density change region according to the set value of a margin region.

Moreover, as a control to reduce the image density in a density change region, the whole control section 101 and the engine control section 141 perform at least one of a control to reduce the intensity of exposure to a photoreceptor or a control to reduce exposure pulse width.

Moreover, when the setup margin region differs from the margin region (the detected margin region) detected by a sensor, the whole control section 101 performs a control to change an imaging region so as to conform the setup margin region to the detected margin region.

Moreover, when dirt is detected at the edge of a transfer sheet by a sensor, the whole control section 101 performs a control to make the display section 110 to show an indication to urge changing the set value with regard to the margin region setup or the density change region setup. Here, the changing of the set value means extending the set value of a margin region, or reducing the set value of the image density more in a density change region.

Moreover, the whole control section 101 and the engine control part 141 perform a control to reduce the image density more in a density change region when dirt is detected at the edge of a transfer sheet by a sensor.

In this case, the whole control section 101 controls such that image density in a density change region is reduced more in order to reduce toner.

Moreover, the whole control section 101 and the engine control part 141 controls the image density decreasing rate a in a density change region independently for each of four sides of a transfer sheet according to the location or amount of dirt detected at the transfer sheet edge.

In this case, the whole control section 101 presumes the occurrence position of toner scattering on the transfer sheet from the location of the dirt detected on the transfer sheet and controls such that the image density is reduced further at a density change region corresponding to the occurrence position and a toner is reduced so that toner scattering on the occurrence position is decreased.

That is, the whole control section 101, or the whole control section 101 or the engine control section 141 constitutes the control section in claims.

Figure 2:
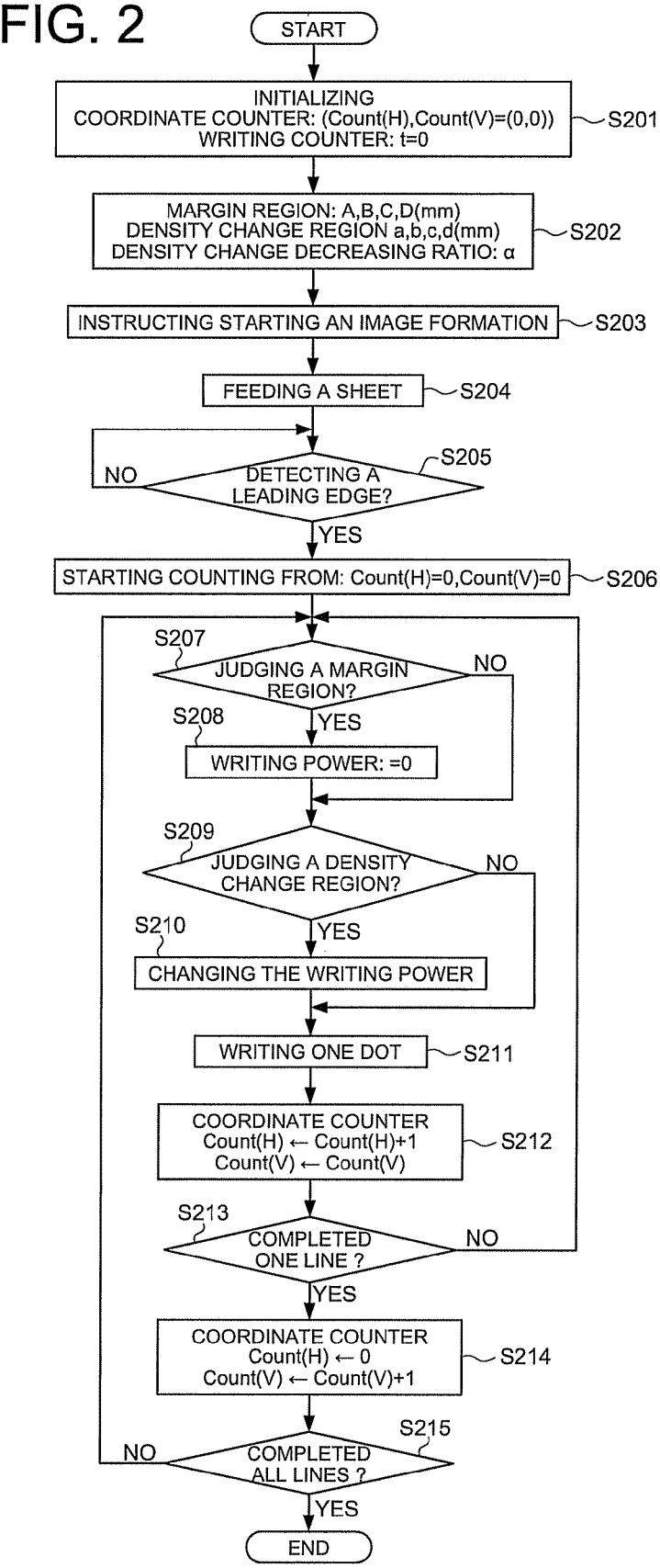
FIG. 2 is a flowchart showing an operational procedure of an image forming apparatus according to an embodiment of the present invention.

Hereafter, explanation of operation is given with reference to the flowchart shown in FIG. 2.

Incidentally, the flowchart shown in FIG. 2 is called in the image formation control program which is operating in the whole control section 101 or the engine control part 141.

In addition, in the explanation of operation of the following embodiment, controls and actions by a subroutine of the whole control section 101, the engine control part 141, and an image formation control program (computer program) are explained with controls merely by the whole control section 101.

First, the whole control section 101 initializes each part, and initializes a coordinate counter and a writing-out counter relevant to this embodiment (step S201 in FIG. 2).

And the whole control section 101 receives setup (margin region setup) of a margin region and setup (density change region setup) of a density change region which is an inner region (imaging region) adjacent to the above-mentioned margin region and in which image density is changed, from a user of an image forming apparatus (step S202 in FIG. 2).

Here, the setup of the margin region may be received from the user of image forming apparatus, or may be a fixed value predetermined beforehand with regard to a density change region.

Figure 5:
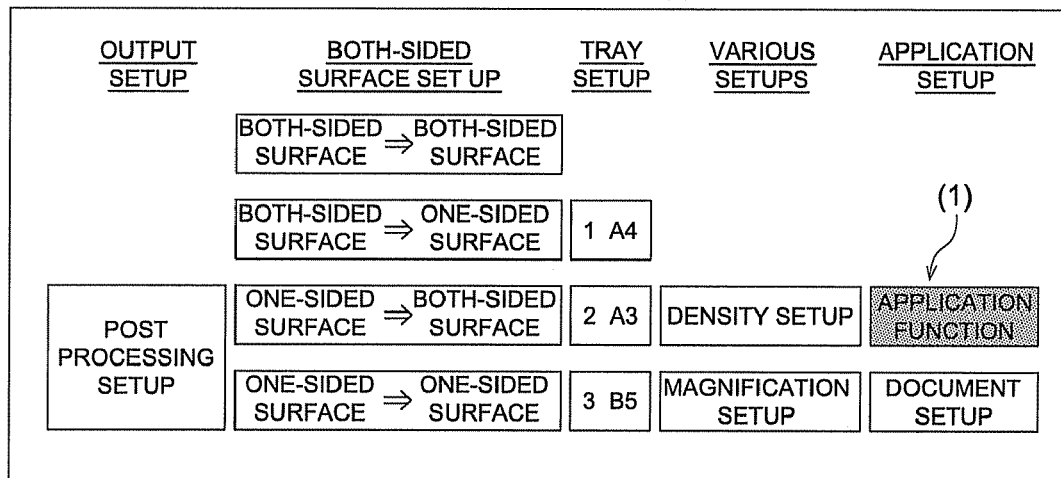
FIG. 5 is an explanatory drawing showing an example of a display screen of an image forming apparatus according to an embodiment of the present invention.

Further, the whole control section 101 controls the display section 110 to usually indicate various basic setup on a basic screen (refer to FIG. 5).

In addition, in this embodiment, the operating section 103 and the display section 110 are shown on the condition that the operating section 103 and the display section 110 are made in one body of a touch-panel type as a concrete example.

If the item of "applicable function" located in right-hand side (FIG. 5 (1)) is chosen on the basic screen of FIG. 5, the whole control section 101 controls the display section 110 to display the application screen (refer to FIG. 6) with regard to various application functions.

Figure 6:
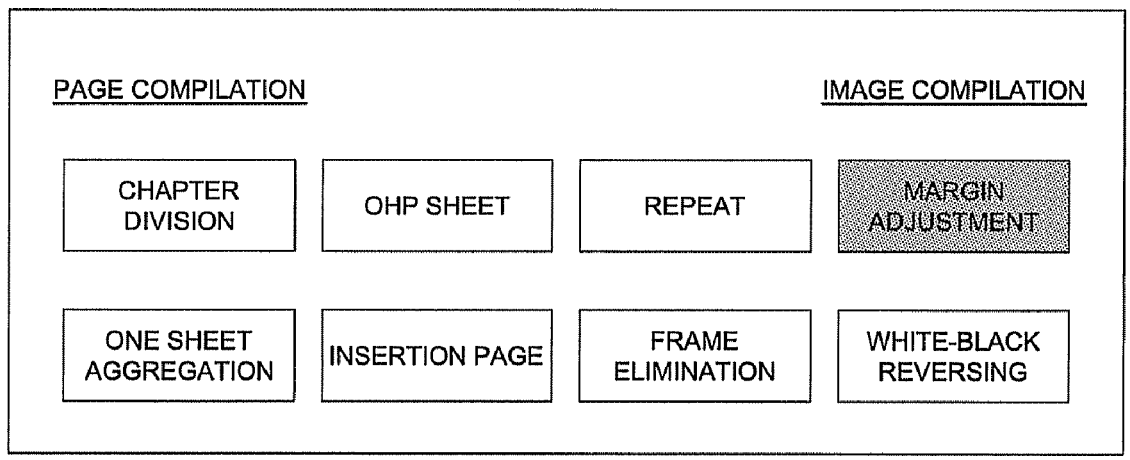
FIG. 6 is an explanatory drawing showing an example of a display screen of an image forming apparatus according to an embodiment of the present invention.

If the item of "margin adjustment" located in right-hand side (FIG. 6 (2)) is chosen on the application screen shown in FIG. 6, the whole control section 101 controls the display section 110 to display the setting screen (refer to FIG. 7) with regard to setup for a margin region and a density change region.

Figure 7:
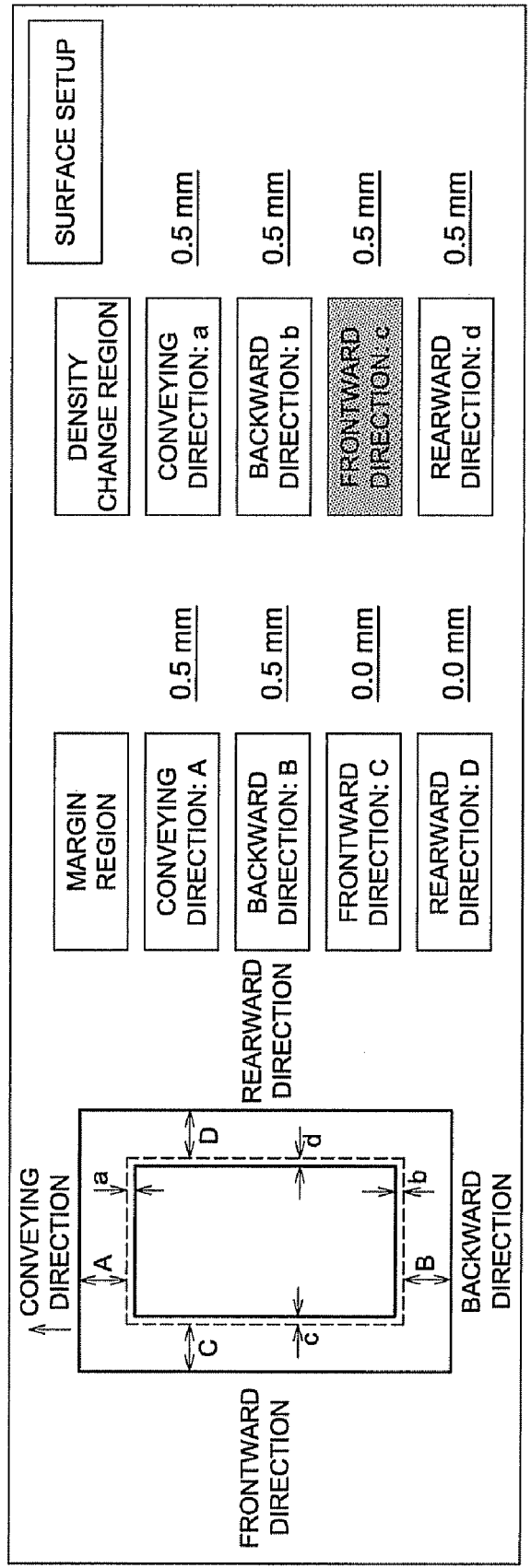
FIG. 7 is an explanatory drawing showing an example of a display screen of an image forming apparatus according to an embodiment of the present invention.

On the setting screen shown in FIG. 7, setup for a margin region and setup for a density change region can be made. On the setting screen shown in FIG. 7, the setup for a margin region can be made independently for each of four sides of a transfer sheet (A, B, C, D). Moreover, on the setting screen of this FIG. 7, the setup for a density change region can be made independently for each of four sides of a transfer sheet (A, B, C, D).

This setup can be made with various kinds of input forms such as a numerical input and adjustment of a numerical value by increasing and decreasing with a tab, or a slide bar. Moreover, although FIG. 7 shows the condition that a preset value or an inputted value was displayed, it may display the range of settable value.

And, in this embodiment, when the whole control section 101 receives a setup of a margin region through the operating section 103, the whole control section 101 receives setup on the condition that a range of setup values of a margin region includes zero.

Moreover, in FIG. 7, a user of an image forming apparatus performs a setup of a margin region and the whole control section 101 may define a setup of a density change region in accordance with the setup of this margin region. In this case, for example, the whole control section 101 determines such that the sum of the margin region and the density change region may become a predetermined width.

Moreover, it may be structured such that a user may set up a margin region, the whole control section 101 may set up a density change region and may display it on the display section 110, and after that, a user can change the setup of the density change region from the operating section 105.

Moreover, it may be structured such that a setup of an image density decreasing rate α in a density change region (0<α<1) can be conducted on a screen which is not illustrated. Here, the numeral 1 means the condition that an image with a usual imaging density is formed based on original image data without changing image density. Also, the numeral 1 means the condition that an image is not formed at all. For example, by setting an image density decreasing rate α at 0.5, an image formation is performed based on image data on the condition that an image density in a density change region is reduced with 50% of an imaging density or signal values in a regular density region. Further, instead of the case where the image density decreasing rate α is set up by a user of an image forming apparatus in the above way, a fixed value of a predetermined value (for example, 0.5 etc.) may be used as it.

If at least a setup of a margin region is completed by a user and an instruction of a start of image formation is obtained from the operating section 103 (step S203 in FIG. 2), the whole control section 101 feeds a transfer sheet from sheet feeding sections 30a-30c in order to perform image formation based on image data which are obtained from documents by being read in a scanner part 105 or image data sent from an external device (step S204 in FIG. 2).

If a transfer sheet is detected by a leading end detecting sensor 82 (it is "Y" at step S205 in FIG. 2), the whole control section 101 receives a detection result from the leading end detecting sensor 82 and then starts counting Count (H) and Count (V) from 0 in a coordinate counter (step S206 in FIG. 2).

Hereafter, at the time of exposing an exposure light beam in a writing section 144 in accordance with image data, with reference to the count value of this coordinate counter, the whole control section 101 judges a margin region/a density change region/a regular density region and controls the power (exposure light beam power) of the exposure light beam.

Figure 8:
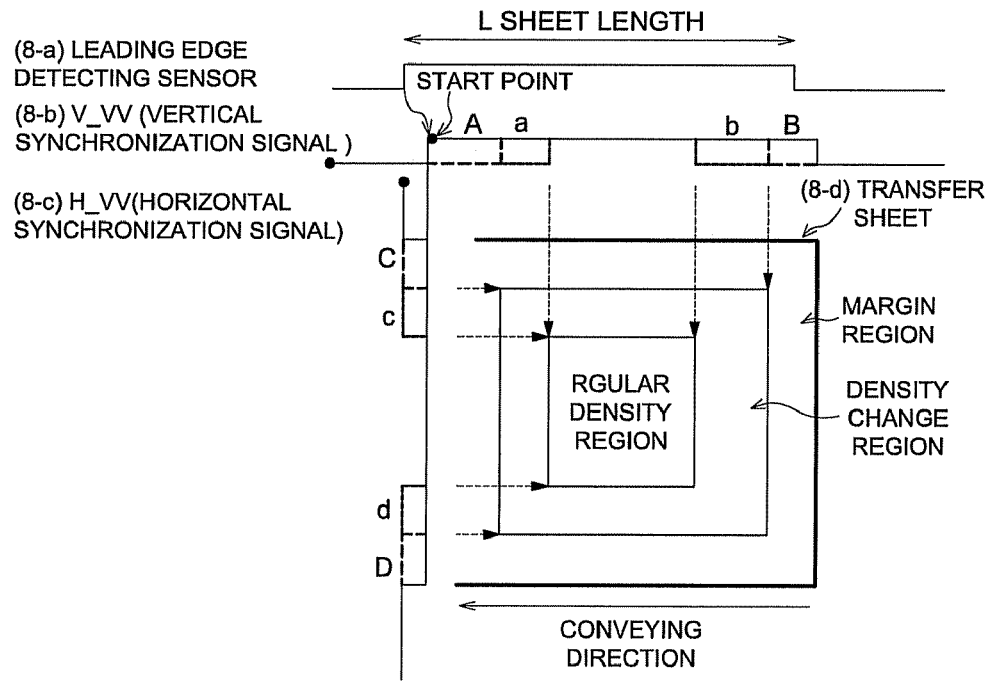
FIG. 8 is an explanatory drawing showing a situation at the time of working of an image forming apparatus according to an embodiment of the present invention.

Here, with reference to FIG. 8, the control of an exposure light beam power in the margin region/density change region/regular density region of a transfer sheet is explained. FIG. 8 shows a detection result (FIG. 8, (8-a)) of a leading end detecting sensor 82, a vertical synchronization signal V_VV (FIG. 8, (8-b)) generated in accordance with the detection result of the leading end detecting sensor 82 in a transfer sheet (FIG. 8, (8-d)) having a length L in a transportation direction and a horizontal synchronization signal H_VV (FIG. 8, (8-c)) generated in accordance with the width of the transfer sheet in a main scanning direction.

Figure 9:
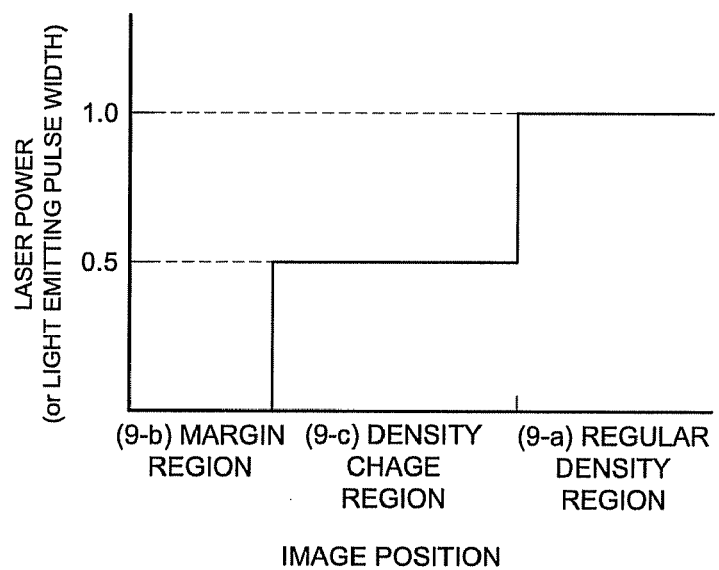
FIG. 9 is an explanatory drawing showing a situation at the time of working of the image forming apparatus according to an embodiment of the present invention.

A peripheral region formed by a margin region "A" corresponding to a setup value "A" in a vertical direction from a leading end of the vertical synchronization signal, a margin region "B" corresponding to a setup value "B" in a vertical direction from a trailing end of the vertical synchronization signal, a margin region "C" corresponding to a setup value "C" in a horizontal direction from one end of the horizontal synchronization signal, and a margin region "D" corresponding to a setup value "D" in a horizontal direction from the other one end of the horizontal synchronization signal is a margin region in which an exposure light beam power is set at "0" as shown with (9-b) in FIG. 9 such that an image is not formed. In this connection, the margin region corresponds to a region (b) in FIG. 3.

An inner region located inward from the margin region formed with the margin regions "A", "B", "C" and "D" is an imaging region (a density change region and a regular density region).

A inner peripheral region formed by a density change region "a" corresponding to a setup value "a" being adjacent the margin region "A", a density change region "b" corresponding to a setup value "b" being adjacent the margin region "B", a density change region "c" corresponding to a setup value "c" being adjacent the margin region "C", and a density change region "d" corresponding to a setup value "d" being adjacent the margin region "D", is a density change region A more-inner region located more inward from the density change region is a regular density region in which the exposure light beam power is set at "100%" as a usual power as shown with (9-a) in FIG. 9 such that an image density is not changed. In this connection, the regular change region corresponds to a region (a) in FIG. 3.

Figure 10:
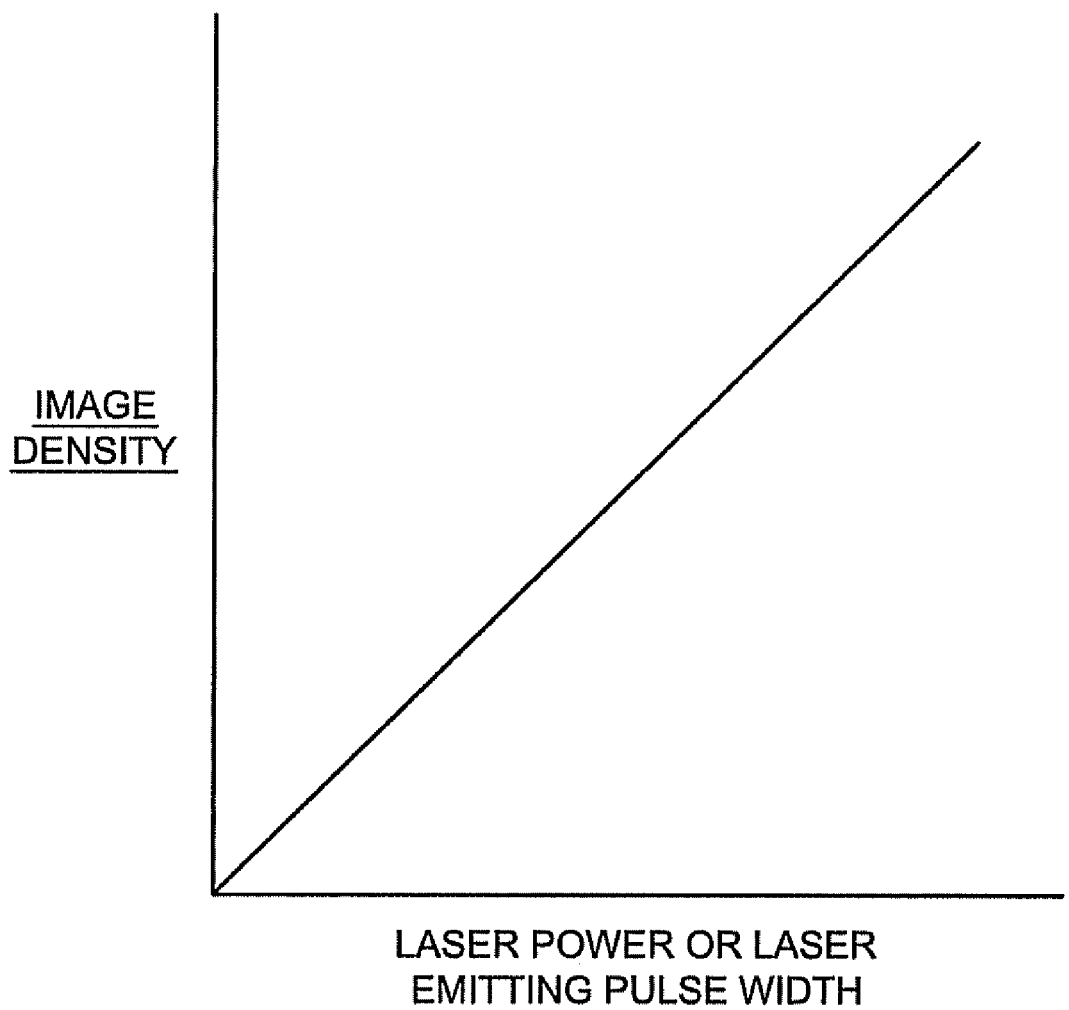
FIG. 10 is an explanatory drawing showing a situation at the time of working of an image forming apparatus according to an embodiment of the present invention.

In the density change region between the margin region and the regular density region, the exposure light beam power is regulated such that an image density is changed. In this connection, the density change region corresponds to a region (c) in FIG. 3. Here, the exposure light beam power in the writing section can be controlled with a light emission intensity or a pulse width in a pulse width modulation, Generally, with the characteristics shown in FIG. 10, the exposure light beam power and the image density are in almost a proportional relationship to each other.

Therefore, in a density change region, by setting the exposure light beam power based on the abovementioned image density decreasing rate α (for example, about 0.5), even if a conveyance deviation of a transfer sheet or a transfer paper size error, etc. arise, an amount of toner which scatters onto conveying members in an apparatus (outside of a transfer sheet) can be decreased, whereby dirt of an image on a transfer sheet edge can be prevented. As a result, it becomes possible to perform an image formation in which an occurrence of dirt on a transfer sheet edge can be suppressed, while responding to a desire of a user who wants to make a margin into the minimum.

Besides, as mentioned later, when an occurrence of dirt on an image-edges part is detected by a line sensor 83, the whole control section 101 can respond to this by changing a setting value of a density change region or an exposure light beam power.

Figure 11:
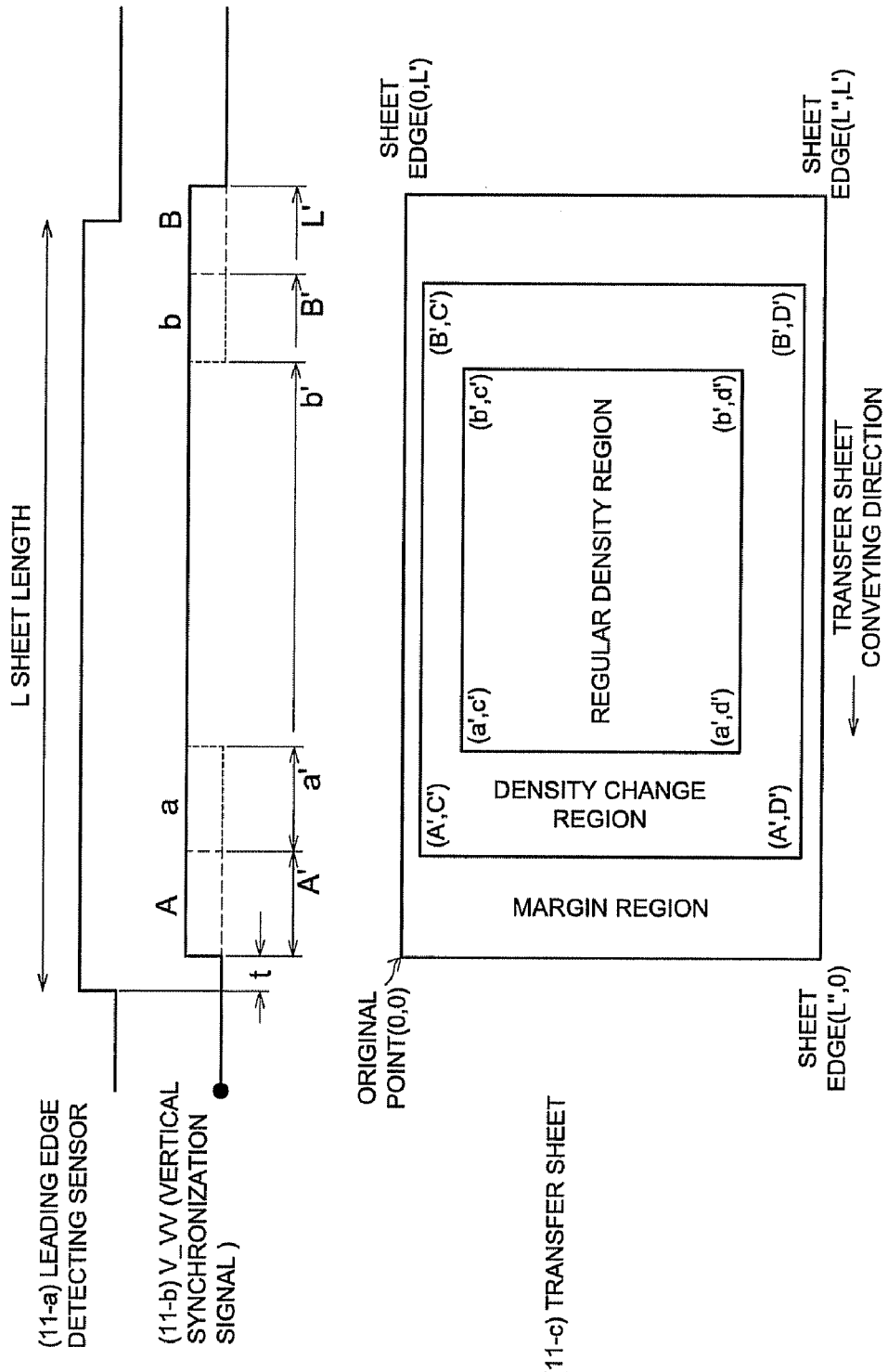
FIG. 11 is an explanatory drawing showing a situation at the time of working of an image forming apparatus according to an embodiment of the present invention.

In this regard, as shown in FIG. 11, coordinate conversion is performed about each region shown in FIG. 8 in correspondence to the number of dots (the number of pixels or the position of each pixel) at the time of carrying out an image formation. Here, when the size of a transfer sheet is supposed such that a vertical direction size is L' dots, a horizontal direction size is L" dots and one corner of the transfer sheet is an original point (0, 0), the other corners of the transfer sheet are made (L", 0), (L", L7), and (0, L'). Further, corners of boundaries between a margin region and a density change region are made (A', C'), (A', D'), (B', D'), and (B', C'). Also, corners of boundaries between a density change region and a regular density region are made (a', c'), (a', d'), (b', d'), and (b', c').

Namely, in this embodiment, when a transfer sheet is detected by the leading end detecting sensor 82 (it is "Y" at step S205 in FIG. 2), the whole control section 101 which receives a detection result from the leading end detecting sensor 82, starts counting a coordinate counter (Count (H) and Count (V)) and judges the region of dots to be written in accordance with the count values.

If dots to be written are in a margin region (it is "Y" at step S207 in FIG. 2), the whole control section 101 sets an exposure light beam power to 0 (step S208 in FIG. 2). If dots to be written are in a density change region (it is "Y" at step S209 in FIG. 2), the whole control section 101 sets an exposure light beam power at a changing condition (step S210 in FIG. 2).

If dots to be written are not in a margin region (it is "N" at step S207 in FIG. 2) and not in a density change region (it is "N" at step S209 in FIG. 2), the whole control section 101 does not change an exposure light beam power.

And, the whole control section 101 performs writing in accordance with the exposure light beam power determined as mentioned above, that is, performs an exposure to a photo conductor with an exposure light beam (step S211 in FIG. 2). Then, the whole control section 101 makes a counter +1 in the horizontal direction and controls to repeat the above action (setup an exposure light beam power based on the region judgment and exposure) until the writing for 1 horizontal line is completed (step S213 in FIG. 2).

If the writing for 1 horizontal line is completed (it is "Y" at step S213 in FIG. 2), the whole control section 101 returns the horizontal count value of the coordinate counter to 0 and makes +1 in the vertical direction, and the whole control section 101 controls similarly writing for 1 horizontal line (steps S207-S213 in FIG. 2).

And the whole control section 101 repeats writing for 1 horizontal line as stated above (steps S207-S213 in FIG. 2) until the writing for all lines for one page is completed (step S325 in FIG. 2). That is, by the setup of the exposure light beam power based on the judgment that to which region the location of dots to be written belong, the writing is performed as shown in FIG. 3.

Moreover, the whole control section 101 monitors with a line sensor 83 whether or not toner which scattered onto conveying members adheres to an edge of a transfer sheet in which an image is formed as mentioned above. Here, when dirt is detected by a line sensor 83 at the edge of a transfer sheet in which the image was formed as mentioned above, the whole control section 101 performs designation to which the setting-out alteration about margin region setup or density change region setup is urged to the display section 110. Here, when dirt is detected by a line sensor 83 at the edge of a transfer sheet in which the image was formed as mentioned above, the whole control section 101 performs an indication to urge changing the setting value about the margin region setup or density change region setup on the display section 110.

In this case, the whole control section 101 displays on the display section 110 for a user of an image forming apparatus such that the margin region or the density change region is increased. Alternately the whole control section 101 displays an indication to ask consent of a user of an image forming apparatus on the display section 110 about an adjustment that the whole control section 101 increases a margin region or a density change region. If a user of an image forming apparatus increases a margin region or a density change region or consents to the adjustment by the whole control section 101 in accordance with this indication, dirt on the transfer sheet edge by toner scattering can be decreased from the next image formation. That is, it becomes possible to carry out adjustment among a desire of a user to make a regular density region into the maximum, a desire of a user to make a margin region into the minimum and a prevention of dirt on a transfer sheet by toner scattering.

Moreover, when dirt is detected at the edge of a transfer sheet by a line sensor 83, the whole control section 101 performs a control to change the image density decreasing rate in the density change region in the next image formation. In this case, the whole control section 101 controls so as to reduce the image density in the density change region more, thereby reducing toner. For example, when the image density decreasing rate a in the density change region is 0.5, the whole control section 101 reduces it to 0.4, 0.3 . . . by 0.1 point respectively until dirt does not occur on the edge of a transfer sheet. Incidentally, these figures are one example and it is also possible to use other numerical values. Since toner scattering hardly occurs by the change of such an image density decreasing rate α, it becomes possible to perform an image formation in which the occurrence of dirt on a transfer sheet edge is suppressed while responding to a desire of a user to make a margin into the minimum.

Moreover, when dirt is detected at the edge of a transfer sheet by a line sensor 83, it is possible for the whole control section 101 to control the image density decreasing rate α in the density change region in accordance with the detected location or amount of dirt independently for each of four sides of a transfer sheet.

For example, when dirt occurs on the transfer sheet edge at the right-hand side in the transfer sheet conveying direction, the image density decreasing rate α is changed still smaller in the density change region of the right-hand side. In this case, as mentioned above, the whole control section 101 reduces it with 0.5, 0.4, and . . . until dirt does not occur. On the contrary, when dirt does not occur at all on the transfer sheet edge at the left-hand side in the transfer sheet conveying direction, it is also possible to change the image density decreasing rate α larger like 0.5, 0.6, 0.7, and . . . in the density change region of the left-hand side until dirt starts occurring Thus, the whole control section 101 estimates the occurrence position of toner scattering on the transfer sheet from the location of the dirt detected on the transfer sheet and controls to reduce toner by reducing image density further in the corresponding density change region so as to reduce toner scattering at this occurrence position. With this, it becomes possible to perform an image formation in which an occurrence of dirt on a transfer sheet edge is suppressed while responding to a desire of a user to make a margin into the minimum.

Effects Obtained by this Embodiment:

In the above embodiment, the whole control section 101 receives a setup about a margin region on which an image is not formed at a transfer sheet edge portion, determines an inner region having a specified width and being adjacent to the set margin region as a density change region in which an image density is changed, determines an inner region located at an inner side from the density change region as a regular density region in which an image is formed with a regular image density, and controls in such a way that in the density change region, an image is formed based on image data on the condition where the image density is reduced, and in the regular density region, an image is formed based on image data without changing the image density. Here, an inner region having a specified width and being adjacent to the set margin region is determined as a density change region, and in the density change region, an image is formed based on image data on the condition where the image density is reduced.

For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region, an amount of toner scattering to conveying members in an apparatus (outside of a transfer sheet) is reduced. As a result, dirt on an image at an edge portion of a transfer sheet can be avoided. Further, when an image is formed with a setup to make a margin region to be zero (no margin region), it is not necessary to reduce a conveying speed and it is possible to form an image with a regular conveying speed. Namely, while responding to a user's request to minimize a margin, it becomes possible to conduct an image formation in which dirt on an edge portion of a transfer sheet is suppressed.

Further, in the above embodiment, a setup is received on the condition that a range of settable value includes zero as a margin region. For this reason, even in the case where an margin region is set at zero by an user of the image forming apparatus and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region, an amount of toner scattering to conveying members in an apparatus (outside of a transfer sheet) is reduced. As a result, dirt on an image at an edge portion of a transfer sheet can be avoided. Namely, while responding to a user's request to minimize a margin, it becomes possible to conduct an image formation in which dirt on an edge portion of a transfer sheet is suppressed.

Further, in the above embodiment, the width of the density change region is a predetermined value. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width, an amount of toner scattering to conveying members in an apparatus (outside of a transfer sheet) is reduced. As a result, dirt on an image at an edge portion of a transfer sheet can be avoided. Namely, while responding to a user's request to minimize a margin, it becomes possible to conduct an image formation in which dirt on an edge portion of a transfer sheet is suppressed.

Further, in the above embodiment, the control section receives a setup about the width of the density change region. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width set by an user of this image forming apparatus, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

Further, in the above embodiment, the whole control section 101 determines the width of the density change region in accordance with a set value of the margin region. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width set by a control section, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

Further, in the above embodiment, in an image forming apparatus to conduct exposure to a photoreceptor in accordance with image data, a control to reduce at least one of the intensity of exposure to the photoreceptor or an exposure pulse width is conducted as a control to reduce the image density in the density change region. With this, the density in the density change region can be controlled appropriately, and it becomes possible to refrain the occurrence of dirt on a transfer sheet edge portion while keeping a good image quality. Namely, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width set by an user of this image forming apparatus (a control to reduce at least one of the intensity of exposure to the photoreceptor or an exposure pulse width), an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

Further, in the above embodiment, the whole control section 101 receives the setup of the margin region or the density change region independently for each of four sides of a transfer sheet. In this case, while responding to a user's request to minimize a margin in each portion in accordance with a portion or a direction where dirt on a transfer sheet is apt to take place due to toner scattering to conveying members in the apparatus (out of the transfer sheet) or a position or a direction where dirt hardly take place, it is possible to realize an image forming apparatus capable of conducting an image formation in which an occurrence of dirt on a transfer sheet edge portion is suppressed. By doing this, it can be possible to respond a user's request to minimize a margin and a user's request to maximize a regular density region.

Further, in the above embodiment, there is provided a sensor 83 to detect an image formed on a transfer sheet, and when the set margin region differs from a margin region (the detected margin region) detected by the sensor 83, the whole control section 101 changes an imaging region (a density change region and a regular density region) so as to conform the setup margin region to the detected margin region. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to adjust a margin region to be a normal condition and to reduce an image density in a density change region with a predetermined width, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

Further, in the above embodiment, the image forming apparatus forms a latent image by exposing a photoreceptor in accordance with image data, develops the latent image on the photoreceptor with toner, transfers a toner image on the photoreceptor to a transfer sheet, thereby forming an image. For this reason, even in the case where an margin region is set at a small value and an image is formed as near as possible to an edge portion of a transfer sheet, if a traveling deviation of a transfer sheet or a size error of a transfer sheet is caused, since an amount of toner to be transferred to an edge portion of a transfer sheet is reduced by a control to reduce an image density in a density change region with a predetermined width, an amount of toner scattering to conveying members in an apparatus (outside of a transfer sheet) is reduced. As a result, dirt on an image at an edge portion of a transfer sheet can be avoided. Namely, while responding to a user's request to minimize a margin or a user's request to maximize an ordinary density region, it becomes possible to conduct an image formation in which dirt on an edge portion of a transfer sheet is suppressed.

Further, in the above embodiment, there is provided a display 110 to conduct various indications and a sensor 83 to detect an image formed on a transfer sheet, when dirt is detected on a edge portion of a transfer sheet, the whole control section 101 controls the display section 110 to display an indication to urge a setup change for the margin region setup or the density change region setup. In this case, the whole control section 101 control the display section 110 to conduct a display to urge an user of the image forming apparatus to increase a margin region or a density change region. With this, it becomes possible to adjust a relationship among a user's request to minimize a margin, a user's request to maximize a regular density region and a prevention of dirt on a transfer sheet due to toner scattering.

Further, in the above embodiment, there is provided a sensor 83 to detect an image formed on a transfer sheet, when dirt is detected on an edge portion of a transfer sheet by the sensor 83, the control section controls to change the image density decreasing rate a in the density change region. In this case, the control section controls to reduce toner by decreasing further the image density in the density change region. With this, while responding to a user's request to minimize a margin or a user's request to maximize an ordinary density region, it becomes possible to conduct an image formation in which dirt on an edge portion of a transfer sheet is suppressed.

Further, in the above embodiment, the whole control section 101 controls the image density decreasing rate in the density change region independently for each of four sides of a transfer sheet in accordance with a position or amount of dirt detected on an edge portion of a transfer sheet. In this case, the control section estimates an occurrence position of toner scattering on a transfer sheet from the position of dirt detected on the transfer sheet, and the control section control to reduce toner by decreasing further the image density in the density change region at a position corresponding to the occurrence position so as to reduce toner scattering at the occurrence position. With this, while responding to a user's request to minimize a margin or a user's request to maximize an ordinary density region, it becomes possible to conduct an image formation in which dirt on an edge portion of a transfer sheet is suppressed.

What is claimed is:

1. An image forming apparatus for forming an image on a transfer sheet based on image data, comprising:
an operating section to set a margin region at an edge portion of the transfer sheet on which an image is not formed at the edge portion of the transfer sheet,
a control section to determine an inner region having a specified width and being adjacent to the determined margin region as a density change region in which an image density is changed, and determines a more inner region located inward from the density change region as a regular density region in which an image is formed with a regular image density, and an image forming section to form an image on the density change region based on image data on the condition where the image density is reduced and to form an image on the regular density region based on image data without changing the image density, wherein the image forming section comprises a photoreceptor having an image forming surface and a toner image forming section to form a toner image, and wherein the image forming section sets an image forming region corresponding in size to the transfer sheet on the image forming surface of the photoreceptor and further sets the margin region, the density change region and the regular density region on the image forming region in accordance with the setup of the operating section and the determination of the control section, the toner image forming section is controlled so as not to form a toner image on the margin region, to form a toner image with the reduced image density on the density change region, and to form a toner image with the regular image density on the regular density region, and the image forming section transfers the toner images formed on the image forming region onto the transfer sheet.

2. The image forming apparatus of claim 1, wherein the operating section sets not to form a margin region on the transfer sheet.

3. The image forming apparatus of claim 1, wherein the control section includes a predetermined value of the width of the density change region.

4. The image forming apparatus of claim 1, wherein the operating section further sets the width of the density change region and the control section adopts the width of the density change region set by the operating section.

5. The image forming apparatus of claim 4, wherein the operating section sets the margin region or the density change region independently for each of four sides of the transfer sheet.

6. The image forming apparatus of claim 1, wherein the control section determines the width of the density change region based on a set value of the margin region set by the operating section.

7. The image forming apparatus of claim 1, wherein the image forming section comprises an exposing section to conduct imagewise exposing based on image data and a photoreceptor to form a image by being imagewise exposed, and the image forming section controls the exposing section based on image data of each pixel to be written an image and position data of each pixel to indicate at which one of the margin region, the density change region and the regular density region each pixel is positioned.

8. The image forming apparatus of claim 7, wherein the image forming section controls at least one of the intensity of exposure or the width of exposure pulse for the photoreceptor as a control to reduce an image density in the density change region.

9. The image forming apparatus of claim 7, wherein the image forming section controls exposure in the margin region and the density change region independently for each of four sides of the transfer sheet.

10. The image forming apparatus of claim 1, wherein the control section includes a sensor to detect an image formed on a transfer sheet, and when the set margin region differs from the detected margin region by the sensor, the control section changes an imaging region so as to conform the set margin region to the detected margin region.

11. The image forming apparatus of claim 1, wherein the image forming section forms a latent image by exposing a photoreceptor in accordance with image data, develops the latent image on the photoreceptor with toner, transfers a toner image on the photoreceptor to a transfer sheet.

12. The image forming apparatus of claim 1, wherein the control section comprises a display to conduct various indications and a sensor to detect an image formed on a transfer sheet, and when dirt is detected on an edge portion of the transfer sheet by the sensor, the control section controls the display section to display an indication to urge changing the set margin region or the set density change region.

13. The image forming apparatus of claim 1, wherein the control section comprises a sensor to detect an image formed on a transfer sheet, when dirt is detected on an edge portion of the transfer sheet by the sensor, the control section controls to change an image density decreasing rate in the density change region.

14. The image forming apparatus of claim 13, wherein the control section controls the image density decreasing rate in the density change region independently for each of four sides of a transfer sheet in accordance with a position or an amount of dirt on an edge portion of a transfer sheet detected by the sensor.

15. The image forming apparatus of claim 1, wherein the control section controls the operation section and the image forming section as a whole control section.

16. An image forming method of forming an image on a transfer sheet based on image data, comprising steps of:

receiving a setup about a margin region on which an image is not formed at a transfer sheet edge portion;

determining an inner region having a specified width and being adjacent to the set margin region as a density change region in which an image density is changed;

determining a more inner region located inward from the density change region as a regular density region in which an image is formed with a regular image density; and controlling in such a way that in the density change region, an image is formed based on image data on the condition where the image density is reduced, and in the regular density region, an image is formed based on image data without changing the image density;

wherein the controlling comprises setting an image forming region corresponding in size to the transfer sheet on an image forming surface of a photoreceptor and further setting the margin region, the density change region, and the regular density region on the image forming region in accordance with the receiving a setup about the margin region and the determining the inner region and the more inner region;

controlling so as not to form a toner image on the margin region, to form a toner image with the reduced image density on the density change region, and to form a toner image with the regular image density on the regular density region; and transferring the toner images formed on the image forming region onto the transfer sheet.

* * * * *